Patented Dec. 28, 1926.

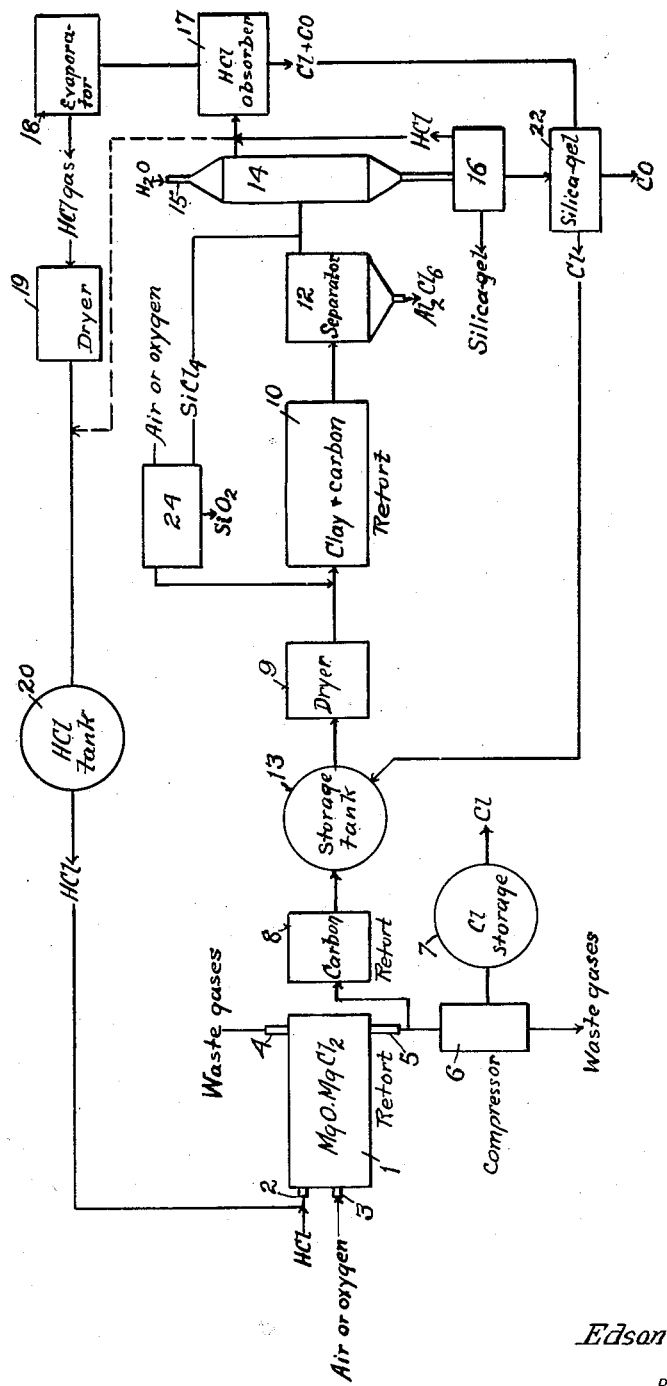

1,612,686

UNITED STATES PATENT OFFICE.

EDSON R. WOLCOTT, OF LOS ANGELES, CALIFORNIA, ASSIGNOR TO THE TEXAS COMPANY, OF NEW YORK, N. Y., A CORPORATION OF TEXAS.

PROCESS FOR THE PRODUCTION OF CHLORINE AND ALUMINUM CHLORIDE.

Application filed February 28, 1921. Serial No. 448,848.

This invention relates to the production of aluminum chloride, and the main object of the invention is to provide an economical process for producing and regenerating chlorine in connection with the production of aluminum chloride.

A further object of the invention is to provide for more effective liberation of aluminum chloride from the retorts producing the same.

The accompanying drawing is a flow sheet of the process as applied to the production of chlorine and aluminum chloride using magnesium oxy-chloride as an agent for production of chlorine from hydrochloric acid.

The process of producing aluminum chloride as hereinafter set forth involves as a preliminary stage the production of chlorine, which is preferably carried out in such manner that it comprises two alternately conducted stages of operation; namely, a chloridizing stage in which magnesium oxide, or other alkaline earth oxide, is subjected to the action of hydrochloric acid gas (hydrogen chloride) under suitable temperature conditions to produce a metallic chloride; and an oxidizing stage, in which the chloride so produced is heated in the presence of oxygen-bearing gas (air or oxygen) to produce metallic oxide, chlorin and water.

These operations may be carried out in a suitable retort, indicated at 1, which may be of any suitable type, either vertical or horizontal, and is provided with suitable heating means (preferably by external heating) for maintaining the retort at proper temperature for the reactions. Said retort is provided with inlet means 2 and 3 for supplying hydrochloric acid gas and oxygen-bearing gas, respectively, and with outlets 4 and 5 for discharge of residual gases in the respective stages of the operation, it being understood that these inlets and outlets will be provided with suitable control means. Outlet 4 is opened in the chloridizing stage only and discharges into the atmosphere. Outlet 5 is opened in the oxidizing stage only and conducts the residual gases to suitable means, such as a compression plant 6, for compressing and cooling the gases to cause separation of chlorine, which passes to suitable receiving means, such as a tank 7, the waste gases passing off as indicated.

I prefer to use as a converting agent for the production of chlorine from hydrochloric acid, magnesium oxide, or a mixture or compound of magnesium oxide and magnesium chloride, such mixture, in a suitable state of division, being provided in the retort 1 and hydrochloric acid gas being supplied thereto through inlet 2 and the retort 1 being maintained at a suitable temperature, for example, red heat, the magnesium compound is converted wholly or partially to the form of magnesium chloride, the other product of the reaction being water (in the form of vapor); which psses off at outlet 4. The hydrochloric acid supply is then shut off and air or oxygen, preferably pre-dried and pre-heated, is supplied through pipe 3 and reacts with the magnesium chloride in the retort 1 to form water and chlorine, the resultant gases passing off through the outlet 5 of the retort to the means 5, 6 and 7 for separating and storing the chlorine. In case air is used as an oxidizing medium, in the above described operation, the nitrogen present in the air serves as a sweeping out gas for driving out the chlorine from the retort 1 as fast as it is produced, thereby accelerating the reaction. In case pure oxygen is used, however, as an oxidizing agent, it has the advantage of producing chlorine gas comparatively free from diluting gases, especially if the proportion of oxygen used is maintained only slightly in excess of the amount required for the reaction taking place in the retort 1; and the chlorine being in concentrated condition can then be compressed directly to the form of liquid chlorine at minimum cost.

The production of chlorine in the above described manner by alternate chloridization and oxidation of the magnesium compound in the retort 1 permits the chlorine to be produced in a more concentrated condition and at less cost than is possible with processes now in use, and has the further advantage that the converting agent (magnesium oxy-chloride) is substantially permanent and the operation may be repeated indefinitely without affecting the capacity of such agent for further operation. It will be understood that, in general, the material present in the retort 1 will be in the nature of an oxy-chloride, the proportions of oxygen and chlorine varying with the successive stages of the operation, the amount of chlorine constituent increasing during the treatment with hydrochloric acid and the amount of oxygen constituent increasing during the treatment with air or oxygen, but, in general, there will not be complete conversion in either stage to the form of oxygen or chloride.

Other metallic compounds may be used in the place of magnesium oxide in carrying out this process, thus, the oxide of calcium, (or other alkaline earth) or the oxide of lead, or of copper may be used, or a mixture of the oxides or of the oxide and chloride of any of these metals.

The above described process is particularly adapted for use in connection with the production of aluminum chloride for the reason that as preferably carried out it provides exit gases in addition to the chlorine which are available in the reactions taking place in the production of aluminum chloride. In such application of the invention it is desirable to remove from the products of reaction in retort 1, during the oxidizing stage, any excess or residual oxygen. For this purpose the gaseous products of reaction are led through a body of carbon in the same retort, or in another retort 8, producing carbon monoxide. The chlorine present may, if desired, be separated from such carbon monoxide by refrigeration or compression, or in any other suitable manner, or the mixture of chlorine and carbon monoxide may be used to produce carbonyl chloride, which may be utilized in the production of other chlorine products, or sold as such, being readily separable from the chlorine and other gases present by reason of its condensibility at a lower pressure or higher temperature. The gases passing from the chlorine producing operation to a storage tank 13 and containing, for example, chlorine and carbon monoxide produced as above described are passed (preferably after thorough drying in a dryer 9 containing sulfuric acid, calcium chloride, or other drying agent) to a retort 10 of any suitable construction, said retort being, for example, of either the horizontal or vertical type, and being provided with means for external heating to maintain the contents of the retort at suitably high temperature, for example, about 900° C. Said retort contains oxygen-bearing aluminum compound, for example, such as clay, or shale, together with carbon, which reacts with the chlorine and carbon monoxide supplied thereto to form aluminum chloride. The excess gases from the retort 10 are passed to a suitable condenser or collecting means 12 for condensing and removing therefrom the aluminum chloride produced. In this operation any carbon monoxide supplied with the chlorine contributes to the reaction taking place in the retort 10, acting as a reducing agent for the oxygen-bearing aluminum compound present. The mixture of oxygen-bearing aluminum compound and carbon in the retort 10 may be produced by mixing alumina, or aluminum silicate material, such as clay, or shale, in a suitable state of division, with low grade coal, coke, or other form of carbon, in a suitable state of division, or, if desired, such mixture of oxygen-bearing aluminum compound and carbon may be produced by heating low grade coal, carbonaceous shale, oil shale, etc., in the retort 10 to drive off volatile constituents, such as hydrocarbons, and leave the residual carbon intimately mixed with aluminum silicate material. In such a case the preliminary distillation of the material to drive off volatile hydrocarbons may take place in a separate retort, or in the retort 10, in which the aluminum chloride is produced and volatilized, such volatile products being carried off or conducted away in such manner as not to pass through the aluminum collecting means 12 and being, if desired, collected and utilized in any suitable manner.

It is desirable to carry out the aluminum chloride production and volatilization with a considerable excess of chlorine beyond that which is required for the reaction in order to insure sufficiently rapid volatilization of aluminum chloride and such excess of chlorine will be present in the residual gases after separation of the aluminum chloride therefrom; such residual gases may also contain carbon monoxide and carbon dioxide produced in the reactions above referred to and more or less silicon tetrachloride. In case there is any considerable amount of silicon tetrachloride thus produced it is desirable to treat the same for recovery of chlorine therefrom, either in the form of free chlorine, or hydrochloric acid. For the production of hydrochloric acid the residual gases may be led from the separator 12 to a spray chamber 14 into which water is supplied by means 15, such water reacting with the silicon tetrachloride to form hydrated silica and hydrochloric acid. The liquid products of this reaction may pass into a separating chamber 16 which may be maintained at such temperature as to cause evaporation of hydrochloric acid gas therefrom, the residual product being treated in any suitable manner to remove any desired proportion of the water therefrom, for example, so as to form silica "gel", which may be utilized or sold for use as an absorbing agent for gases, or for other purposes. The gases passing from the apparatuses 14 and 16 may be treated with water in an absorber 17 to form liquid hydrochloric acid and the resulting solution may then be heated in an evaporator 18 to drive off hydrochloric acid gas with more or less water vapor, the latter being removed in dryer 19, if necessary, the dried hydrochloric acid gas being stored in a storage chamber 20 and either sold as a commercial product, or utilized as desired for the production of chlorine, for example, by passing same through the inlet 2. When the gas is used in this manner as a chloridizing agent in retort 1, it need not be dried. It is not necessary in that case to ever remove the chlorine from the hydrochloric acid gas, and the gases may pass directly from the chamber 14 to the retort 1, it being understood that suitable pumping means are provided for forcing the gases back to such retort.

The gases passing from the absorber 17 may contain the excess chlorine above referred to, together with carbon monoxide, and by passing such gases in contact with a mass of silica "gel", or other absorbing agent, in a suitable container 22 the chlorine may be absorbed in such mass and subsequently liberated therefrom by heating, or otherwise, and thereby separated from the carbon monoxide. The chlorine so produced substantially free from other substances may be conducted to the retort 10, or to supply tank 13, for re-use, and the carbon monoxide so recovered from the apparatus 22 may be utilized in any suitable manner, for example, as fuel for one or more of the retorting operations above referred to.

The gas containing silicon tetrachlorid passing from the separator 12 may be treated for direct production of chlorine, for example, it may be passed to a reaction chamber 24 to which air is supplied and which is maintained at suitable temperature to effect reaction between the silicon tetrachloride and the oxygen to produce silica and free chlorine, such chlorine being utilized in any suitable manner, for example, being passed back to the retort 10 aforesaid, and the silica being utilized or sold as a commercial by-product.

An important feature of the above described method of chlorine production is that the treatment of the metallic oxide with hydrogen chloride is substantially in the absence of free oxygen, and, on the other hand, during the treatment of the resulting metallic chloride with oxygen, hydrogen chloride is substantially absent, thereby rendering the operation more effective than when the two gases are brought concurrently in contact with a catalytic body.

The temperature of the retort 1 may be maintained in each of the stages of the process at that point which is most suitable for the special operation to be carried out, or for the production of the particular product desired, for example, the temperature during the chloridizing operation may be maintained somewhat above 100° C. so that the water produced in this operation will be in the form of steam but the temperature will not be sufficiently high to cause undue reaction of the steam with the metallic chloride produced; if desired, however, the retort during this operation may be at ordinary atmospheric temperature as the chloridizing reaction takes place at this temperature. The oxidizing action, during which the metallic chloride is subjected to the action of oxygen, may take place at a higher temperature than the chloridizing action, for example, at about 500° C. In some cases, however, both stages of the operation may take place at the same temperature, the retort being heated uniformly during both stages of the operation.

While an advantage of this process is that chlorine may be produced in relatively pure and concentrated form, it may be so carried out that more or less hydrochloric acid passes over with the chlorine, for example, if the chloridizing operation is so carried out that some water is retained by the charge in the retort 1, or if the oxygen-bearing gas contains some water, then hydrochloric acid will pass over along with the chlorine produced and in this way a mixed gas containing chlorine and hydrochloric acid may be produced, which is especially desirable in some cases, for example, such a mixed gas may be used in the preliminary operation in the aluminum chloride producing retort to volatilize iron, or other impurities in the aluminum silicate material. If it is desired to produce chlorine without admixture with hydrochloric acid, the charge in the retort 1 should be free from water by heating or otherwise and the oxygen-bearing gas should also be free from water, so as to prevent production of hydrochloric acid. Similarly, in the aluminum chloride producing operation, the charge in the retort 10 should be free from water and the chloridizing gases introduced thereinto should be free from water so as to prevent interference with the production of aluminum chloride by the presence of water.

What I claim is:

1. The process which consists in passing hydrochloric acid gas in contact with heated alkaline earth oxide to form the chloride thereof, then passing oxygen bearing gas in contact with the resulting metallic chloride to produce the oxide and free chlorine, an excess of such oxygen bearing gas being used in the operation, effecting the reduction of the remaining oxygen contained in the chlorine gas mixture, passing the reduced gas mixture into contact with oxygen bearing compound of aluminum together with carbon in heated condition to produce and volatilize aluminum chloride, separating aluminum chloride from the resulting gases, treating the remaining gases to produce hydrochloric acid from the chlorine bearing constituents and utilizing such hydrochloric acid, together with the oxide aforesaid, in cyclic operation of the process.

2. A process as set forth in claim 1 wherein treatment of the said remaining gas comprises contacting the same with water to form hydrochloric acid and hydrated silica and separating the hydrochloric acid and hydrated silica thus formed.

3. The process of making aluminum chloride which consists in passing currents of hydrochloric acid gas and oxygen-containing gas into contact with a heated mass comprising an oxychloride of an alkaline earth metal, passing the resultant chlorine-containing gases into contact with heated carbon to convert into carbon monoxid any oxygen contained in said gases and then bringing the oxygen-freed chlorine-containing gas into contact with argillaceous material and a reducing agent heated to produce vapors comprising aluminum chloride and silicon tetrachloride, separating the aluminum chloride from said vapors, treating the silicon tetrachloride to produce hydrochloric acid gas and passing said gas into contact with aforesaid alkaline earth oxychloride.

4. The process of making aluminum chloride which consists in passing currents of hydrochloric acid gas and oxygen-containing gas into contact with a heated mass comprising an oxychloride of an alkaline earth metal, passing the resultant chlorine-containing gases into contact with heated carbon to convert into carbon monoxid any oxygen contained in said gases and then bringing the oxygen-freed chlorine-containing gas into contact with argillaceous material and a reducing agent heated to produce vapors comprising aluminum chloride and silicon tetrachloride, separating the aluminum chloride from said vapors, hydrolyzing said silicon tetrachloride to produce hydrochloric acid gas and passing said gas into contact with aforesaid mass of oxychloride.

In testimony whereof I have hereunto subscribed my name this 17th day of February, 1921.

EDSON R. WOLCOTT.